United States Patent [19]

Kudelski

[11] 3,734,368

[45] May 22, 1973

[54] MAGNETIC TAPE RECORDER WITH CONSTANT TAPE TENSION

[76] Inventor: Stefan Kudelski, Ch. de la Croix, 1052 Lemont-sur-Lausanne, Switzerland

[22] Filed: Nov. 26, 1971

[21] Appl. No.: 202,478

[30] Foreign Application Priority Data

Nov. 27, 1970 Switzerland ........................17582/70

[52] U.S. Cl. ....................226/44, 226/111, 226/195, 318/7

[51] Int. Cl. ............................................B65h 25/04

[58] Field of Search..........................226/42, 44, 111, 226/195, 25; 318/7, 6

[56] References Cited

UNITED STATES PATENTS

| | | | |
|---|---|---|---|
| 3,667,664 | 6/1972 | Schroeder | 226/111 X |
| 3,419,202 | 12/1968 | Maxey | 226/195 X |

*Primary Examiner*—Allen N. Knowles
*Assistant Examiner*—Gene A. Church
*Attorney*—James M. Heilman

[57] ABSTRACT

A magnetic tape recorder having a tape tension regulator for maintaining a constant tension on the tape while recording, reproducing or erasing. A resiliently mounted pulley is coupled to an impedance in the motor input circuit so that a displacement of the pulley controls the speed of the motor.

11 Claims, 3 Drawing Figures

STEFAN KUDELSKI
INVENTOR
BY James M. Heilman
ATTORNEY

MAGNETIC TAPE RECORDER WITH CONSTANT TAPE TENSION

This invention concerns improvements in or relating to magnetic tape recorders and is particularly concerned with ensuring that, during its movement past the recording and playback heads of a magnetic tape recorder, the tension in the magnetic tape is substantially constant.

It is known that the tension of the magnetic tape in a tape recorder plays a very important part in the recording and reproduction quality. Any variation in tension causes a variation in the length of the tape during its passage past the recording and playback heads which causes a wowing effect which greatly impairs the recording and reproduction quality of the apparatus.

Attempts have been made to avoid this difficulty by using stretching devices and other tension regulating systems, such as, for example, the so-called "closed loop" system. However, although some improvements have been obtained, these systems are unable to absorb all the variations in the tension of the tape during its passage in front of the recording and playback heads and even the smallest tension variation causes wow.

With the aim of alleviating these difficulties, the present invention provides apparatus for ensuring that the magnetic tape of a tape recorder moves with constant tension during its passage in front of the recording and playback heads, the apparatus comprising two motor driven capstan drives for the magnetic tape arranged one on either side of the heads relative to the direction of movement of the magnetic tape, and a regulator response to variations in the tension of the tape between the two capstan drives for controlling the speed of the drive motor at least one of the capstan drives.

The accompanying drawing shows schematically and by way of example only an embodiment of the invention.

Figure 1:
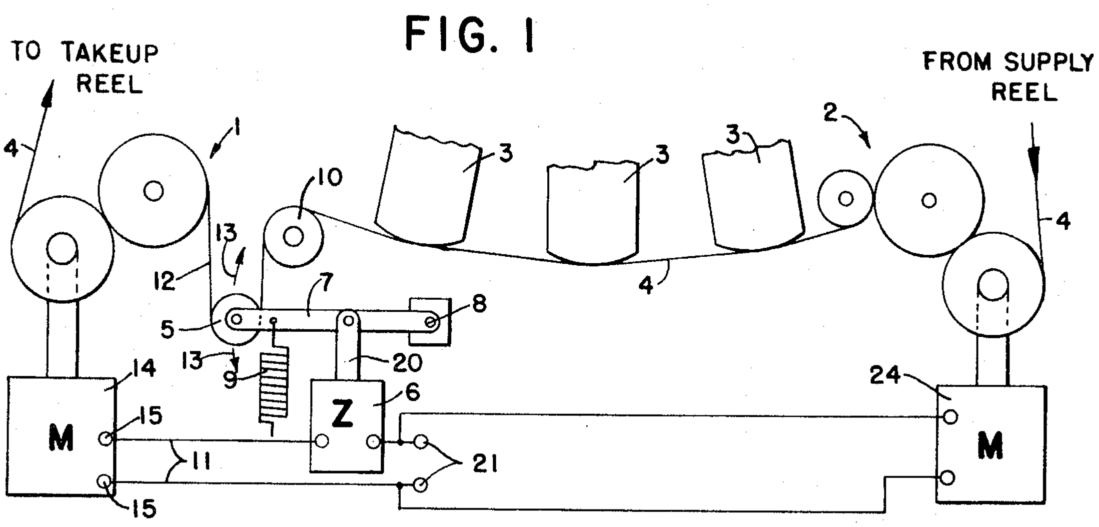
FIG. 1 is a plan view of the embodiment which illustrates its operating principles.

The apparatus shown comprises two individually motor driven capstan drives 1 and 2 arranged one on either side of recording and playback heads 3 for moving the magnetic tape 4 past the heads 3. The capstan drives 1 and 2 as well as the recording and playback heads 3 are mounted on a base (not shown) of a tape recorder, and the tape 4 passes to capstan drive 1 from a first reel and leaves capstan drive 2 towards a second reel, the two reels being mounted on the base in any known or appropriate manner.

On leaving the capstan drive 1, the tape 4 is looped as shown at 12 and passes around a resiliently mounted pulley 5 forming part of a control regulator 6. The pulley 5 is rotatably mounted at one end of a lever 7, the other end of which is pivoted from a fixed point 8 of the tape recorder base. A return spring 9 acts on the lever 7 to maintain the pulley 5 in contact with the loop 12 and ensure a predetermined tension. On leaving the pulley 5, the tape 4 passes around a return pulley 10 mounted on the tape recorder base and serves to position the tape in relation to the recording and playback heads 3.

The control regulator 6 is connected to the drive motor 14 of the capstan drive 1 whose speed it controls. On the drawing this connection is schematically represented by the conductors 11 which extend from the impedance 6 and connected in series with the motor terminals 15. This speed control can be realized in any appropriate or known manner such as a variable resistor 16 shown in FIG. 2 having a variable contact at the end of a rockable arm 18. The arm 18 is connected to arm 7 by a rod 20. FIG. 3 is an alternate form of variable impedance and is used when alternating current power is applied to terminals 21. A ferromagnetic core 22 is secured to rod 20 and is positioned within a winding 23 which is connected in series with motor 14.

The main function of the control regulator is the maintenance of a constant tape tension during the passage thereof in front of the recording heads 3. The operation is as follows: With the two drive motors 20 and 24 of the capstan drives 1 and 2, the tape moves at a constant speed and the control regulator regulates for a given tape tension. As long as the tension in the tape remains constant the length of the loop 12 does not vary and the regulator does not function. If, however, there is a variation in the tape tension in the zone between the capstan drives 1 and 2 this tape tension variation manifests itself as a variation in the length of the loop 12. The lever 7 then pivots in the direction of one of the arrows 13 and the regulator 6 modifies the drive motor speed of capstan drive 1 until normal tension is re-established. These operations being practically simultaneous and the regulator acting by monitoring the tape loop, the tape tension will not be modified between the time when the variation occurred and that time when this variation is corrected because the loop 12 absorbs this variation. The above-described apparatus therefore permits a movement at completely constant tension of the tape in front of the recording heads.

Figure 2:
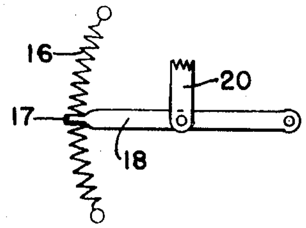
FIG. 2 is a schematic diagram of one form of impedance which may be used in the circuit.
Figure 3:
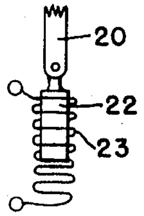
FIG. 3 is a diagram similar to FIG. 2 but showing a variable solenoid.

FIGS. 2 and 3 show two impedance control units which can be used to vary the speed of motor 14. It is also within the scope of the invention to use a combination of these units or a mechanical resistance. One mechanical resistance control which is well known includes a felt pad secured to the end of arm 18 and in mechanical contact with a rotating disk (not shown) run by the motor 14.

The three recording head units 3 shown in the drawing may be used for recording, reproduction and erasing. When the apparatus is used for either recording or reproduction (playback) it is important to use the tension regulator for high quality sound transfer.

According to a variant (not illustrated), the two capstan drive motors can be controlled by the regulator, the control of the two motors being effected in opposite directions so that when one of the motors is accelerated by the regulator, the other is simultaneously decelerated, and vice versa.

The embodiments of the invention in which an exclusive property or privilege is claimed are defined as follows:

1. Apparatus for regulating the tension of a magnetic tape while the tape is moved through a tape recorder by means of two electric motors, comprising: a first capstan drive coupled to the first motor and in contact with the tape to move it to a take up reel; a resiliently mounted pulley in running contact with a loop portion of the tape, the position of said pulley being responsive to the tension of the tape; a second capstan drive coupled to a second motor to pull the tape from a supply reel; and a variable impedance coupled to said pulley and having its impedance value controlled by the position of the pulley, said impedance connected in series with the first motor for controlling the motor speed.

2. Apparatus as claimed in claim 1 wherein said pulley is mounted at one end of an arm which is pivotally mounted at its other end and connected to a spring means for providing the tape tension.

3. Apparatus as claimed in claim 2 wherein said arm is coupled to a sliding contact moving along a resistance element coupled to an input circuit of the motor.

4. Apparatus as claimed in claim 2 wherein said arm is coupled to a ferromagnetic core moving in the magnetic field of a conductive winding and wherein the winding is coupled to an input circuit of the motor.

5. Apparatus as claimed in claim 1 wherein said impedance is connected in series with the electric motor input circuit.

6. Apparatus for ensuring that the magnetic tape of a tape recorder moves with constant tension during its passage in front of at least one magnetic head characterized in that two tape capstan drives are arranged one on either side of the magnetic head, two motors for driving said tape capstans, and a regulator responsive to variations in the tension of the tape between said two capstan drives for controlling the speed of at least one of the capstan drive motors.

7. Apparatus according to claim 6 characterized in that the regulator controls the speed of both capstan drive motors, the controls of the two motors being effected in opposite directions.

8. Apparatus according to claim 6 characterized in that a tape loop is created between one of the capstan drives and said magnetic head, and the control regulator is sensitive to the variations in the length of the loop.

9. Apparatus according to claim 8 characterized in that the control regulator includes a movable member for engagement in the loop formed by the tape, said movable member being resiliently biased for maintaining it in contact with the base of the loop and ensuring that said loop has a predetermined tension, the regulator being sensitive to the displacements of said movable member.

10. Apparatus according to claim 8 characterized in that the movable member is a rotatable pulley.

11. Apparatus according to claim 10 characterized in that the pulley is mounted at one end of an arm which is pivotally mounted at the other end and is connected to spring means for providing said resilient bias.

* * * * *